Patented May 29, 1934

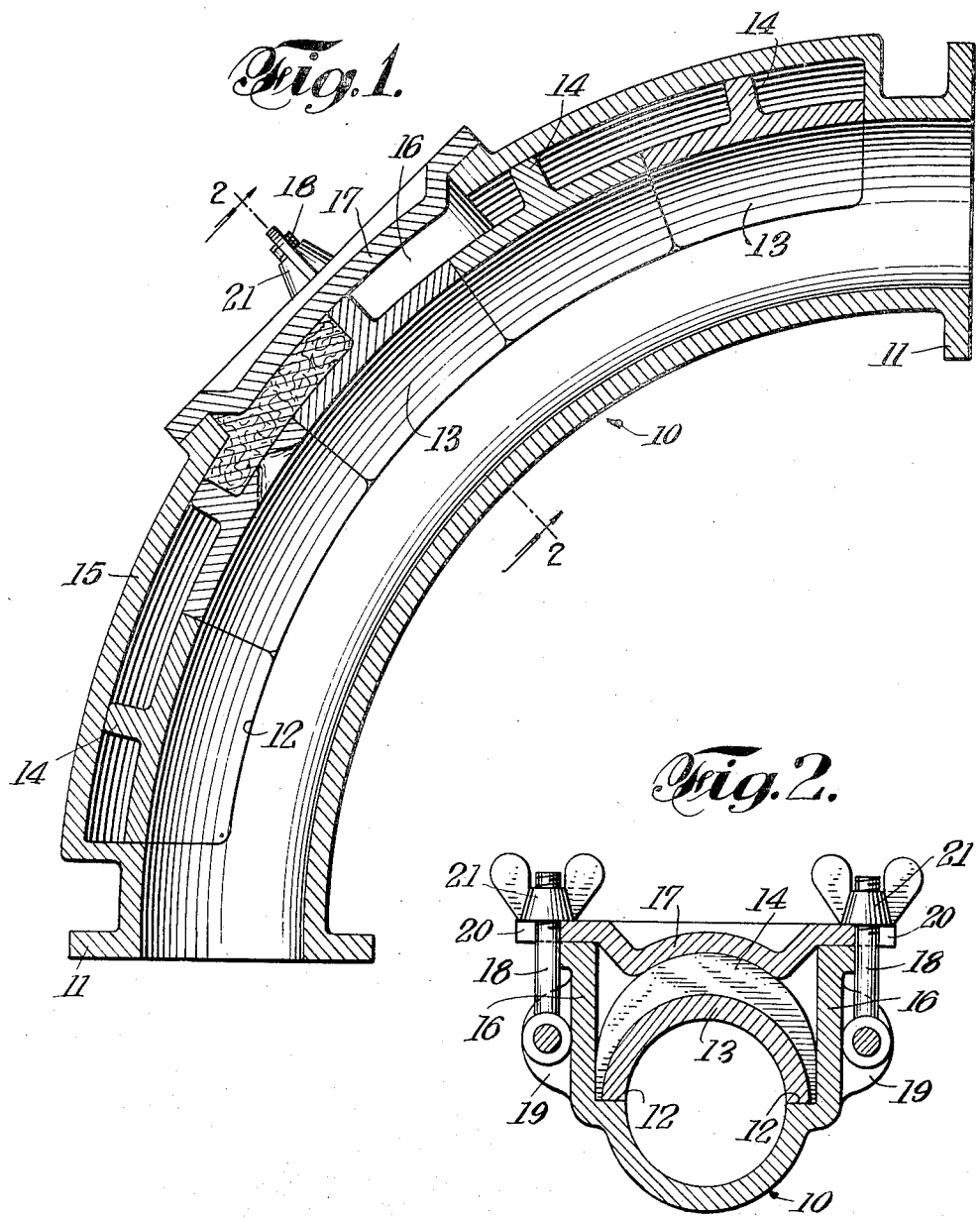

1,960,412

UNITED STATES PATENT OFFICE 1,960,412

PIPE BEND

Georg Domina, Berlin, Germany, assignor to Cement-Gun Company, Inc., a corporation of New York Application August 3, 1932, Serial No. 627,332
In Germany September 4, 1931

4 Claims. (Cl. 137—75)

The present invention relates more particularly to pipe bends for use in pipe lines for transporting abrasive material, as, for example, in back filling operations in mines in which waste material is carried back to replace the valuable material, such as coal, which has been removed. The waste material may be carried through the pipe lines by a current of fluid, preferably air, which not only carries it through the pipe but packs it firmly into its final position to prevent settling of the ground above the backfilled portion of the mine.

In pneumatic backfilling operations the material is forced through the pipe lines and deposited at the desired points and, where high pressure systems are used, the material is packed so tightly that it will be compressed but slightly when a load is put thereon. The material passing through the pipe lines will tend to have an abrasive action thereon, particularly at the bends where the material tends to strike the outer side of the bend with considerable force, and this is particularly true where high pneumatic pressures are used and the material is driven through the pipes at high speed. High pressure systems are, however, particularly advantageous in that the material is packed much tighter and much larger pieces of material can be handled than with low pressure systems.

An important object of the present invention is to provide a device adapted to meet the requirements of service in such high pressure and other systems. Another object is to provide a new and improved pipe section containing interchangeable lining members. A further object is to provide a novel device of the character described which will be efficient in action, simple in construction and economical to manufacture.

According to a preferred embodiment of the invention, use is made, at the place where the tendency to abrasion and shock is greatest, of interchangeable lining members which at one face complete the inner surface of the pipe and at the other or outer face are provided with projections which determine the distance between the lining members and an outer support which closes the pipe at that side. Preferably the projections or spacers are in the form of transverse ribs at the middle of the lining members. The pipe at the bend is shaped to receive the lining members and is provided with an opening through which the lining members may be inserted and removed, said opening being closed during use of the pipe by a suitable cover removably held in position. The cover may extend along the entire length of the section where the spacers are located, in which case the liners may be inserted and removed directly, or may extend only part way along this section, in which case only part of the liners may be inserted and removed directly and the rest of them must be shifted in one direction into position longitudinally of the pipe to position them properly during insertion and in the opposite direction for removal. During use the waste material tends to work through the openings or interstices at the edges of the liners and fill the open chambers at the back thereof to exert a cushioning or shock absorbing action on the plates or liners. In the event that the liners are worn through, the holes thus formed do not interfere with efficient action in that the shock will be absorbed and wear prevented by filling the hollow chambers at the back of the liners or lining plates.

Other objects and advantages will appear upon consideration of the following description and of the drawing, in which Fig. 1 is a longitudinal section of a pipe bend embodying a preferred form of the invention; and Fig. 2 is a section taken along the line 2—2 of Fig. 1.

Referring to the drawing, 10 designates a pipe bend having at its ends suitable means, such as flanges 11, whereby the pipe bend may be secured to pipe lengths (not shown). The outer side of the pipe bend receives the impact of the abrasive material carried through the pipe bend by a current of fluid, such as air. The abrasive material may contain pieces of considerable size which will strike against the outer side of the bend. It will be evident therefore that, if an ordinary pipe bend were used the outer side thereof, would be destroyed much sooner than the rest of the pipe bend and necessitate replacing of the whole pipe bend.

It is desirable therefore to provide a pipe bend with provisions for shock absorbing and with the outer side replaceable thus avoiding complete change of the pipe bend at frequent intervals. To this end, the pipe bend at the part where the greatest wear and stress occur may be formed with an inner portion having a substantially semi-circular cross-section provided at its edges with shoulders 12 for engagement by the corresponding edges of a plurality of curved plates or members 13 adapted to complete the pipe proper of the pipe bend. The plates or members 13 may be held against the shoulders 12 in any suitable manner. Preferably, as shown in the drawing, each plate 13 is provided at its outer face with a projection, here shown as a curved rib 14 intermediate the ends of the plate, which is supported by the outer side of a projection or casing 15 formed integral with the inner portion of the pipe bend and adapted to receive the plates 12 and ribs 14 and hold the plates in position.

In order to permit insertion and removal of the plates 13, the projection 15 at the outer side of the pipe bend is provided with an opening between parallel side walls 16 so that the plates 13 can be inserted and removed at this point. The plates 13, which are normally located beyond the ends of the opening, must be inserted therethrough and slid along through corresponding parts of the projection 15 until they reach their final positions. The ribs 14 at the outer side of the plates 13 are in position to engage the outer wall of the casing, with the exception of the plate or plates opposite said opening, which plates are held in position by a cover 17 which may be considered as a removable portion of the outer side of the casing 15. Said cover is preferably so shaped as to engage the edges around said opening and to fit around the curved ribs 14, and removably held in position by bolts 18 pivoted on ears 19 on the side walls of the projection so as to swing into and out of slots 20 in the edges of the cover 17. Threaded on the free ends of the bolts 18 are wing nuts 21 which may be tightened to hold the cover in place as indicated in Fig. 2 or may be loosened to permit the bolts to be swung outwardly and release the cover.

It will be evident (Fig. 1) that with the arrangement described the plates 13 will be shorter at their side edges than at said side middles so as to be wedge-shaped with the base of the wedges at their edges which rest on the shoulders 12. Furthermore the plates 13 will to a certain extent be resiliently supported so as to absorb shocks. In use the finer particles of material will tend to work through the interstices or openings around the plates 13 and eventually fill the chamber at the back of these plates, thus producing an additional cushioning and shock absorbing action. When after considerable use a plate 13 is worn through and a hole such as 22 formed therein, it is not necessary to replace this plate immediately inasmuch as the back filling material 23 will merely build up to the inner surface of the corresponding plate and will assist the shock absorbing action rather than detract therefrom. In some cases where the bend is very slight the portion containing the replaceable plates 15 may be substantially straight and at the discharge end of the bend. In these cases the bend proper may be made up of a short piece of pipe with flanges at its ends and inclined to each other so as to form a wedge-shaped pipe section. It will also be understood that in some cases the cover 17 may extend the whole length of the part containing the plates and that in other cases more than one cover may be used.

It should be understood that various changes may be made in the construction and arrangement of parts and that various features may be used without others without departing from the true spirit and scope of the invention.

Having thus described my invention, I claim:

1. The combination of a pipe section forming part of a pipe bend and having an open side and a casing integral with said pipe section and enclosing said open side, and a plurality of removable liners in said casing substantially completing the interior surface of the pipe section, each of said liners including a plate of substantial uniform thickness curved both longitudinally and transversely to complete the interior of the pipe and a transverse rib projecting from the outer side of said plate and extending substantially completely across the same for engagement with the inner surface of and support by said casing.

2. The combination of a pipe section forming part of a pipe bend and having an open side and a casing having sides integral with the sides of said pipe section but spaced outwardly therefrom to form shoulders at the edges of the sides of said pipe section, and a plurality of removable liners in said casing substantially completing the interior surface of the pipe section, each of said liners including a curved plate to engage said shoulders and complete the interior of the pipe and a transverse rib at the outer side of said plate for engagement with the inner surface of support by said casing, said casing having an opening opposite said pipe section to permit insertion and removal of said liners, a cover for said opening and means for fastening the cover over said opening and holding said liners in position with respect to said pipe sections.

3. The combination of a pipe section forming part of a pipe bend and having an open side and a casing integral with said pipe section and enclosing said open side, and a plurality of removable liners in said casing substantially completing the interior surface of the pipe section, each of said liners including a plate curved transversely and longitudinally to complete the interior of the pipe and a transverse rib projecting from the outer side of said plate intermediate its ends for engagement with the inner surface of and support by said casing.

4. The combination with a pipe bend having its outer side open for a predetermined length providing at each side of said open side longitudinally extending shoulders and having a casing integral with said pipe bend outside of said shoulders and extending across said open side, and a plurality of interchangeable resilient liners, each of said liners including a curved plate of substantially uniform thickness adapted to rest on said shoulders and complete the inner surface of the pipe bend at that point and a central transverse rib at its outer side adapted to engage the inner surface of said casing and be supported thereby.

GEORG DOMINA.